(12) United States Patent
Maresh et al.

(10) Patent No.: US 11,027,834 B2
(45) Date of Patent: Jun. 8, 2021

(54) INBOARD CENTRIFUGAL FORCE BEARING ATTACHMENT

(71) Applicant: Textron Innovations Inc., Providence, RI (US)

(72) Inventors: Andrew Maresh, Lewisville, TX (US); Troy Cyril Schank, Keller, TX (US); Chyausong Tzeng, Arlington, TX (US); John Richard McCullough, Weatherford, TX (US); Robert Wardlaw, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 221 days.

(21) Appl. No.: 15/902,402

(22) Filed: Feb. 22, 2018

(65) Prior Publication Data

US 2019/0256205 A1    Aug. 22, 2019

(51) Int. Cl.
| | |
|---|---|
| *B64C 27/48* | (2006.01) |
| *B64C 3/32* | (2006.01) |
| *F16F 1/38* | (2006.01) |
| *B64C 27/473* | (2006.01) |

(52) U.S. Cl.
CPC ............. *B64C 27/48* (2013.01); *B64C 3/32* (2013.01); *F16F 1/3842* (2013.01); *B64C 2027/4736* (2013.01)

(58) Field of Classification Search
CPC ..... B64C 3/32; B64C 2027/003; B64C 27/32; B64C 27/322; B64C 27/33; B64C 27/35; B64C 27/48; F16F 1/3842
See application file for complete search history.

(56) References Cited

U.S. PATENT DOCUMENTS

| | | | |
|---|---|---|---|
| 4,028,002 A | 6/1977 | Finney et al. | |
| 4,232,563 A * | 11/1980 | Peterson | B64C 27/32 248/635 |
| 4,257,739 A * | 3/1981 | Covington | B64C 27/35 416/134 A |
| 4,430,045 A | 2/1984 | Cresap | |
| 5,186,686 A | 2/1993 | Staples et al. | |
| 5,316,442 A * | 5/1994 | Mouille | B64C 27/35 416/134 A |
| 5,601,408 A | 2/1997 | Hunter et al. | |
| 5,620,305 A | 4/1997 | McArdle | |
| 6,007,298 A | 12/1999 | Karem | |
| 6,296,444 B1 | 10/2001 | Schellhase et al. | |
| 6,641,365 B2 | 11/2003 | Karem | |
| 7,510,377 B1 * | 3/2009 | Carter, Jr. | B64C 27/024 416/104 |
| 8,226,355 B2 | 7/2012 | Stamps et al. | |
| 8,231,346 B2 | 7/2012 | Stamps et al. | |
| 9,090,344 B2 | 7/2015 | Stucki | |
| 9,126,680 B2 | 9/2015 | Stamps et al. | |
| 9,254,915 B2 | 2/2016 | Stamps | |

(Continued)

*Primary Examiner* — Courtney D Heinle
*Assistant Examiner* — Sang K Kim
(74) *Attorney, Agent, or Firm* — Lawrence Youst PLLC

(57) ABSTRACT

An inboard bearing attachment for carrying centrifugal force ("CF") loads in a rotor blade assembly of a rotorcraft includes a CF fitting having a curved surface and a shear bearing retainer aligned with the curved surface. A mounting flange connected to either the CF fitting or the shear bearing retainer is used to mount the inboard bearing attachment to a yoke.

13 Claims, 7 Drawing Sheets

(56) References Cited

U.S. PATENT DOCUMENTS

| | | |
|---|---|---|
| 9,656,747 B2 | 5/2017 | Shundo et al. |
| 9,873,507 B2 * | 1/2018 | Foskey .................. B64C 27/35 |
| 2008/0247876 A1 * | 10/2008 | Stamps .................. B64C 27/35 |
| | | 416/140 |
| 2010/0230529 A1 * | 9/2010 | Stamps .................. B64C 27/35 |
| | | 244/17.11 |
| 2013/0004311 A1 * | 1/2013 | Stamps .................. B64C 27/35 |
| | | 416/1 |
| 2013/0105637 A1 | 5/2013 | Stamps et al. |
| 2014/0248150 A1 | 9/2014 | Sutton et al. |
| 2014/0255191 A1 * | 9/2014 | Jarrett .................... F16C 33/04 |
| | | 416/134 A |
| 2014/0271180 A1 * | 9/2014 | Haldeman ................ F01D 7/00 |
| | | 416/1 |
| 2015/0239555 A1 * | 8/2015 | Foskey .................. B64C 27/35 |
| | | 416/134 A |

* cited by examiner

INBOARD CENTRIFUGAL FORCE BEARING ATTACHMENT

BACKGROUND

This section provides background information to facilitate a better understanding of the various aspects of the disclosure. It should be understood that the statements in this section of this document are to be read in this light, and not as admissions of prior art.

Rotor systems of rotorcraft and tiltrotor aircraft include a yoke connected to a drive mast driven by a power source. The yoke transfers the torque provided by the power source to rotor blades. The yoke is connected to the rotor blades with inboard and outboard bearing assemblies. Depending on aircraft configuration, the yoke may be manufactured of steel for strength or composite material for weight savings. The inboard and outboard bearing assemblies include bearings that accommodate forces acting on the rotor blades allowing each rotor blade to flex with respect to the yoke/mast and other rotor blades. A particular distance between the inboard and outboard bearing assemblies is dependent on the aircraft configuration where each configuration has an optimal distance for that particular aircraft's loads and dynamics. Typically, the outboard bearing assembly includes a centrifugal force ("CF") bearing and a shear bearing connected to both the rotor blade and a tip of a yoke arm while the inboard bearing assembly includes a shear bearing connected to both the rotor blade and the yoke in a cut-out proximate the drive mast. CF loads can be significantly greater than shear loads. If an aircraft configuration repositions the CF bearing to the inboard bearing assembly, the connection between the inboard bearing assembly and the yoke that typically carries only shear forces provides a possible failure point because of the greater CF loads it now carries.

SUMMARY

An example of an inboard bearing attachment for a rotorcraft includes a centrifugal force ("CF") fitting including a curved surface, a shear bearing retainer axially aligned with the curved surface, and a mounting flange connected to one of the CF fitting and the shear bearing retainer.

An example of a tiltrotor aircraft includes a yoke arm including a central aperture and a tip outboard of the central aperture, a cut-out in the yoke arm inboard of the tip, a centrifugal force ("CF") fitting connected to the yoke arm and positioned within the cut-out, a shear bearing retainer connected to the yoke arm and positioned within the cut-out, and a CF load path through the CF fitting and the yoke arm inboard of the tip.

An example of a tiltrotor aircraft includes a yoke connected to a hub spring, the yoke including a tip positioned outboard of the hub spring and a cut-out positioned inboard of the tip, an inboard bearing retainer connected to the yoke and the hub spring and positioned within the cut-out, and a CF load path through the inboard bearing retainer, the yoke, and the hub spring inboard of the tip.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
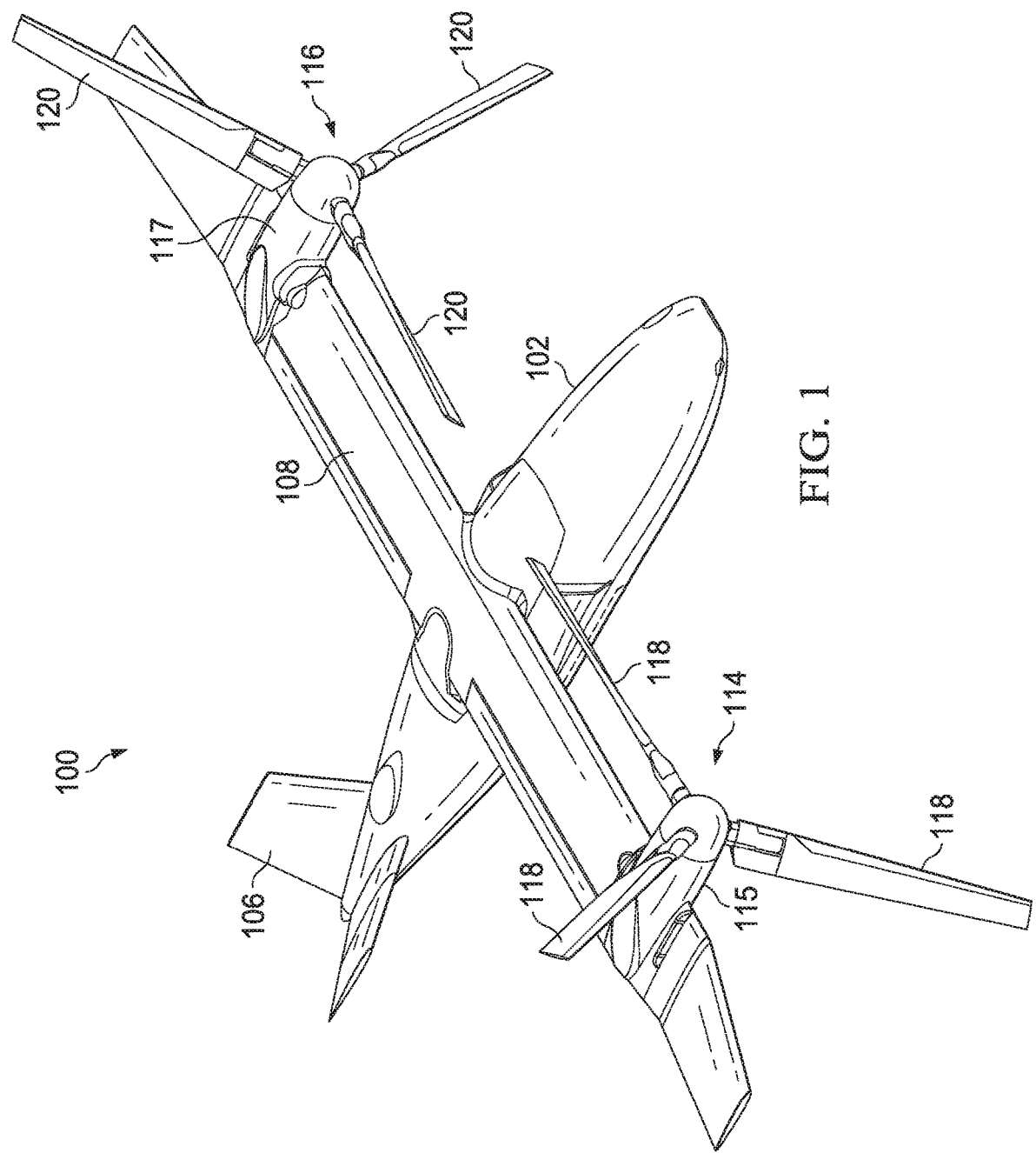
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, an illustrative tiltrotor aircraft 100 is shown. Tiltrotor aircraft 100 includes fuselage 102, tail member 106, wing 108, rotor system 114, and rotor system 116. Rotor system 114 is connected to nacelle 115 located on an end portion of wing 108, while rotor system 116 is connected to nacelle 117 located on an opposite end portion of wing 108. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of rotor blades 118. Rotor system 116 includes a plurality of rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear supports tiltrotor aircraft 100 when tiltrotor aircraft 100 is landing or when tiltrotor aircraft 100 is at rest on the ground. Further, rotor systems 114 and 116 are illustrated in the context of tiltrotor aircraft 100; however, a singular rotor system with foldable or non-foldable rotor blades can be implemented on other non-tilting rotor and helicopter rotor systems. It should also be appreciated that teachings from tiltrotor aircraft 100 may apply to other aircraft such as airplanes and unmanned aircraft which employ rotor systems.

Generally each rotor system includes a drive mast driven by a power source. A rotor system includes a yoke connected to the drive mast with a hub and rotor blades indirectly connected to the yoke with inboard and outboard bearing assemblies. The inboard and outboard bearing assemblies may include inboard and outboard beams coupled to bearings at inboard and outboard bearing attachments. The bearings accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from flapping and coning of the rotor blades. Flapping generally refers to the gimbaling motion of the hub that connects the yoke to the mast. Coning generally refers to the upward or downward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, drive mast, and yoke are components for transmitting torque. The power source may include a variety of components including an engine, a transmission, and differentials. In operation, the drive mast receives torque from the power source and rotates the yoke. Rotation of the yoke causes the rotor blades to rotate with the drive mast and yoke.

Figure 2:
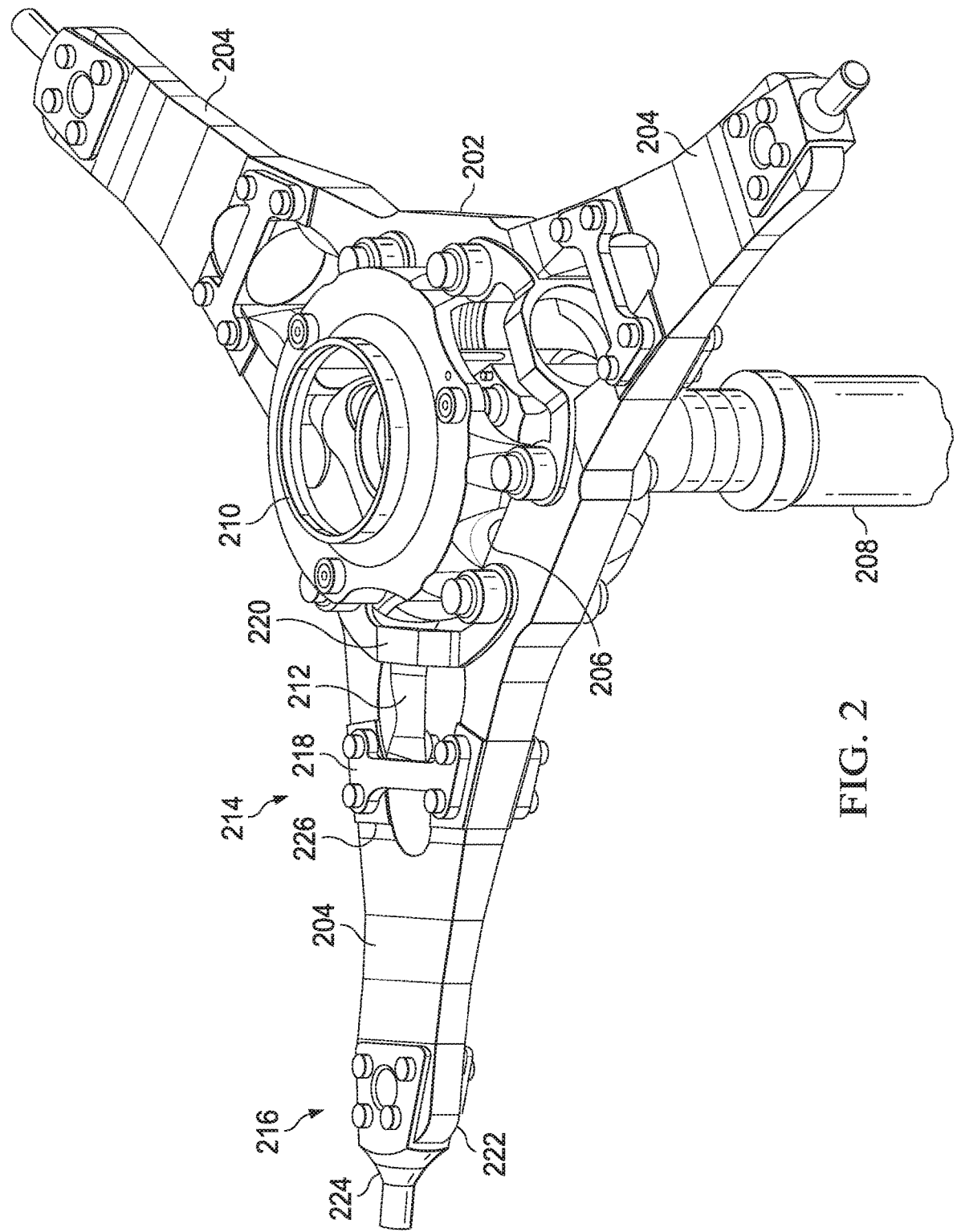
FIG. 2 is a perspective view of a yoke according to aspects of the disclosure.

Referring to FIG. 2, each rotor system 114, 116 includes a separate yoke 202. Yoke 202 includes a plurality of yoke arms 204 extending radially from a central aperture 206. Yoke 202 is connected to drive mast 208 through central aperture 206 via hub spring 210. Each yoke arm 204 is formed with yoke 202 such that each yoke arm 204 is a unitary portion of the yoke. Each yoke arm 204 is generally equally spaced from each other around the central aperture. For example, in the three rotor blade configuration shown, 120° separates each yoke arm. For weight saving purposes and flexibility, Yoke 202 may be, for example, a composite part constructed from reinforcement material, such as fiberglass suspended in epoxy resin or a rubber compound. Each yoke arm 204 includes cut-out 212 that opens to central aperture 206.

Each yoke arm 204 includes inboard bearing attachment 214 and outboard bearing attachment 216. Inboard bearing attachment 214 is attached to yoke arm 204 at cut-out 212. Inboard bearing attachment 214 includes CF fitting 218 and inboard shear bearing retainer 220. Inboard bearing attachment 214 is attached to a centrifugal force ("CF") bearing and an inboard shear bearing. Both the CF bearing and the inboard shear bearing are also attached to an inboard beam which may connect to a cuff or grip which extends to a rotor blade. Spacers 226 may be attached to and positioned between CF fitting and yoke arm 204. Spacers 226 are used to align CF fitting 218 with inboard shear bearing retainer 220 as the thickness of yoke arm 204 may vary along its length. Outboard bearing attachment 216 is attached to yoke arm 204 at tip 222. Outboard bearing attachment 216 includes outboard shear bearing spindle 224. Outboard bearing attachment 216 is attached to an outboard shear bearing. The outboard shear bearing is attached to an outboard beam which may connect to the cuff or grip. The CF bearing, the inboard spindle bearing, and the outboard spindle bearing are generally elastomeric bearings constructed from a rubber type material that absorb vibration and provide for limited movement of the rotor blades relative to the yoke and drive mast.

In the interest of clarity, a single yoke arm/inboard bearing attachment arrangement is described herein with the understanding that each yoke arm includes an inboard bearing attachment and outboard bearing attachment. It should be appreciated that teachings regarding inboard bearing attachment 214 can apply to rotor systems having greater or fewer yoke arms/rotor blades.

Figure 3:
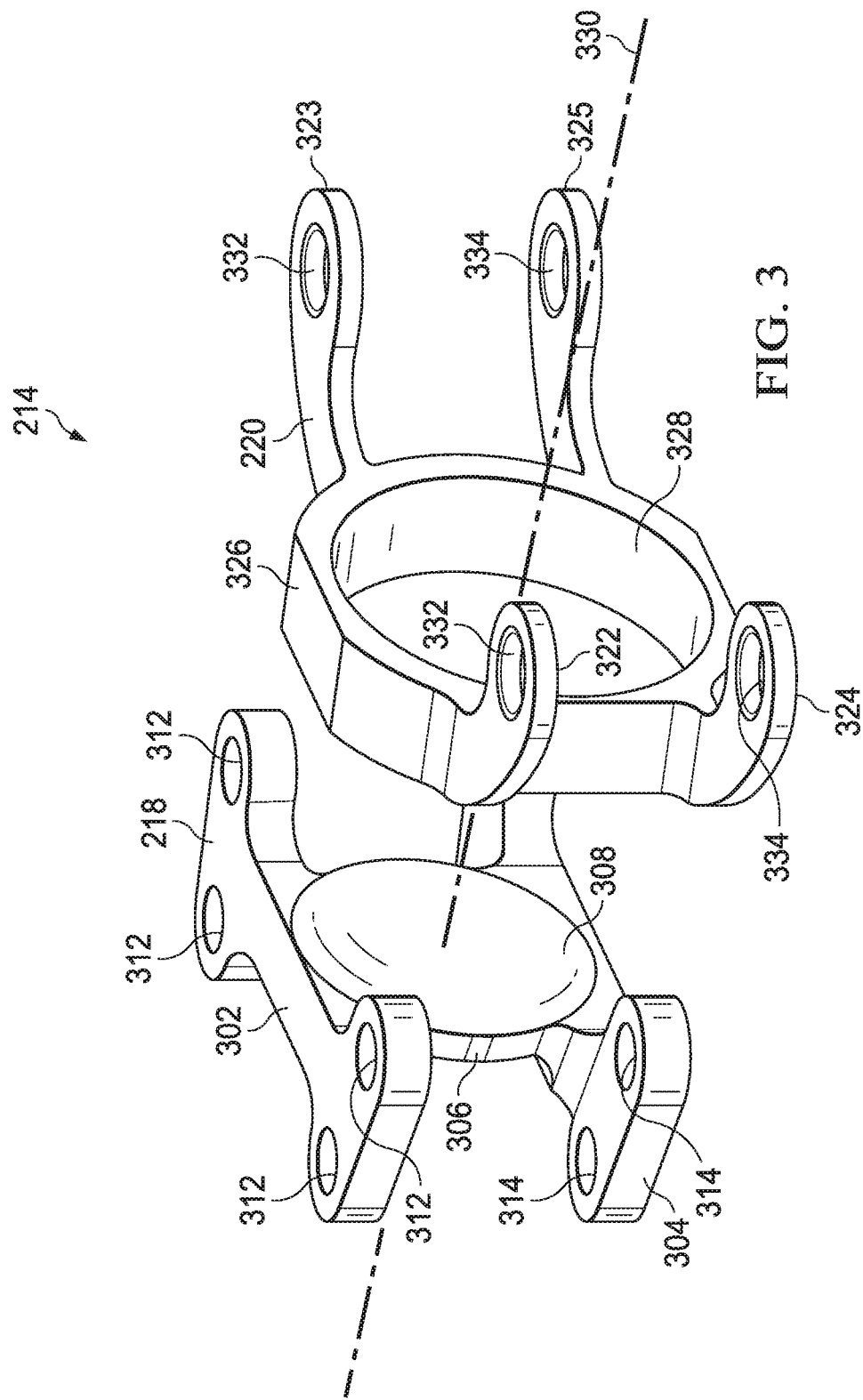
FIG. 3 is a perspective view of an inboard bearing attachment according to aspects of the disclosure.

Referring to FIG. 3, inboard bearing attachment 214 includes CF fitting 218 and inboard shear bearing retainer 220. For strength purposes, CF fitting 218 and inboard shear bearing retainer 220 are metal and may be manufactured of, for example, aluminum, steel, or titanium.

CF fitting 218 includes upper plate 302 spaced from lower plate 304 by block 306. Upper plate 302 and lower plate 304 include mounting holes 312, 314, respectively. Mounting holes 312, 314 are used to connect CF fitting 218 to yoke arm 204. Block 306 includes curved surface 308. Curved surface 308 is conical or parabolic shaped. The CF bearing, attached to the inboard beam, may be vulcanized to curved surface 308 which prevents rotation of the CF bearing relative to CF fitting 218. Alternatively, curved surface 308 may include a slot which mates with a tab extending from the CF bearing to provide the anti-rotation functionality. CF fitting 218 may be a unitary piece including upper plate 302, lower plate 304, and block 306. Alternatively, upper plate 302 and/or lower plate 304 may be separately attached to block 306 to provide for alternate installation methods. In the event upper plate 302 and/or lower plate 304 are separate pieces from block 306, either can be manufactured with appropriate thickness such that spacer 226 is unnecessary.

Inboard shear bearing retainer 220 includes upper flanges 322, 323 and lower flanges 324, 325 extending from cylinder 326. Upper flanges 322, 323 include mounting holes 332. Lower flanges 324, 325 include mounting holes 334. Mounting holes 332, 334 are used to connect inboard shear bearing retainer to yoke arm 204 and hub spring 210. Cylinder 326 is hollow and includes interior cylindrical surface 328. The inboard shear bearing, attached to a spindle extending from the inboard beam, is encompassed by inboard shear bearing retainer 220. An outer cylindrical surface of the inboard shear bearing is contained by interior cylindrical surface 328.

CF fitting 218 is positioned relative to inboard shear bearing retainer 220 such that curved surface 308 and cylinder 326 share central axis 330. CF fitting 218 and inboard shear bearing retainer 220 are axially aligned along central axis 330.

Figure 4:
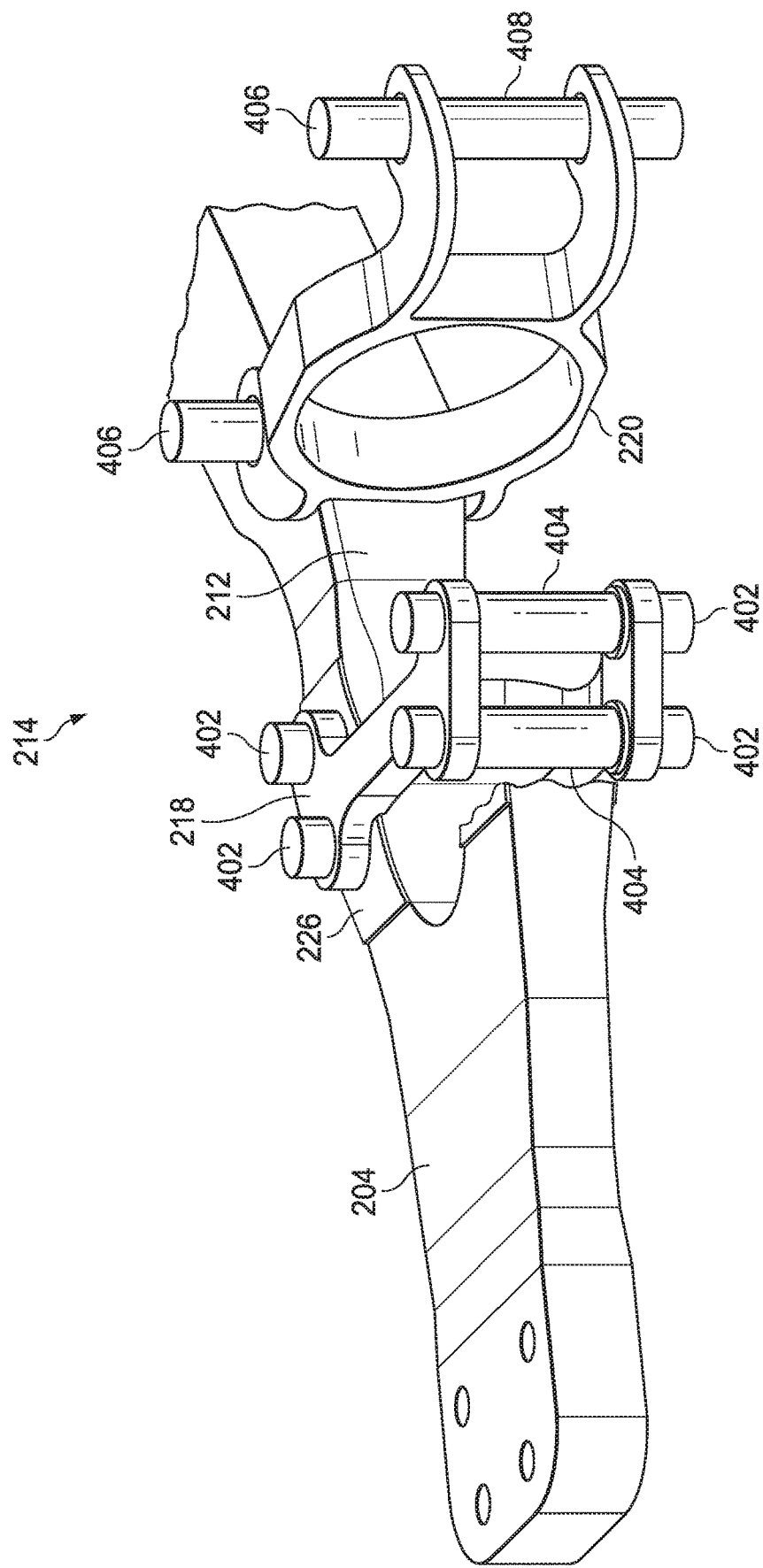
FIG. 4 is a sectional perspective view of an inboard bearing attachment attached to a yoke according to one or more aspects of the disclosure.

Referring to FIG. 4, inboard bearing attachment 214 is attached to yoke arm 204 and positioned within cut-out 212. Fitting bolts 402 are sized to engage bushings 404 seated within mounting holes 312, 314. Fitting bolts 402 are used to connect CF fitting 218 to yoke arm 204 with a CF connection. Although four fitting bolts 402 are depicted, it is understood that greater or fewer fitting bolts may be used to attach CF fitting 218 to yoke arm 204 depending on load requirements of tiltrotor aircraft 100. Retainer bolts 406 are sized to engage bushings 408 seated within mounting holes 332, 334. Retainer bolts 406 are used to connect inboard shear bearing retainer 220 to yoke arm 204 and hub spring 210. Bushings 404 and 408 are not required, and may be used to help spread any CF load carried by fitting bolts 402 and retainer bolts 406, respectively.

The CF load path of a rotor blade attached to yoke 202 is from the rotor blade, to the inboard beam, through the CF bearing to CF fitting 218, through fitting bolts 402/bushings 404, to yoke arm 204.

Figure 5:
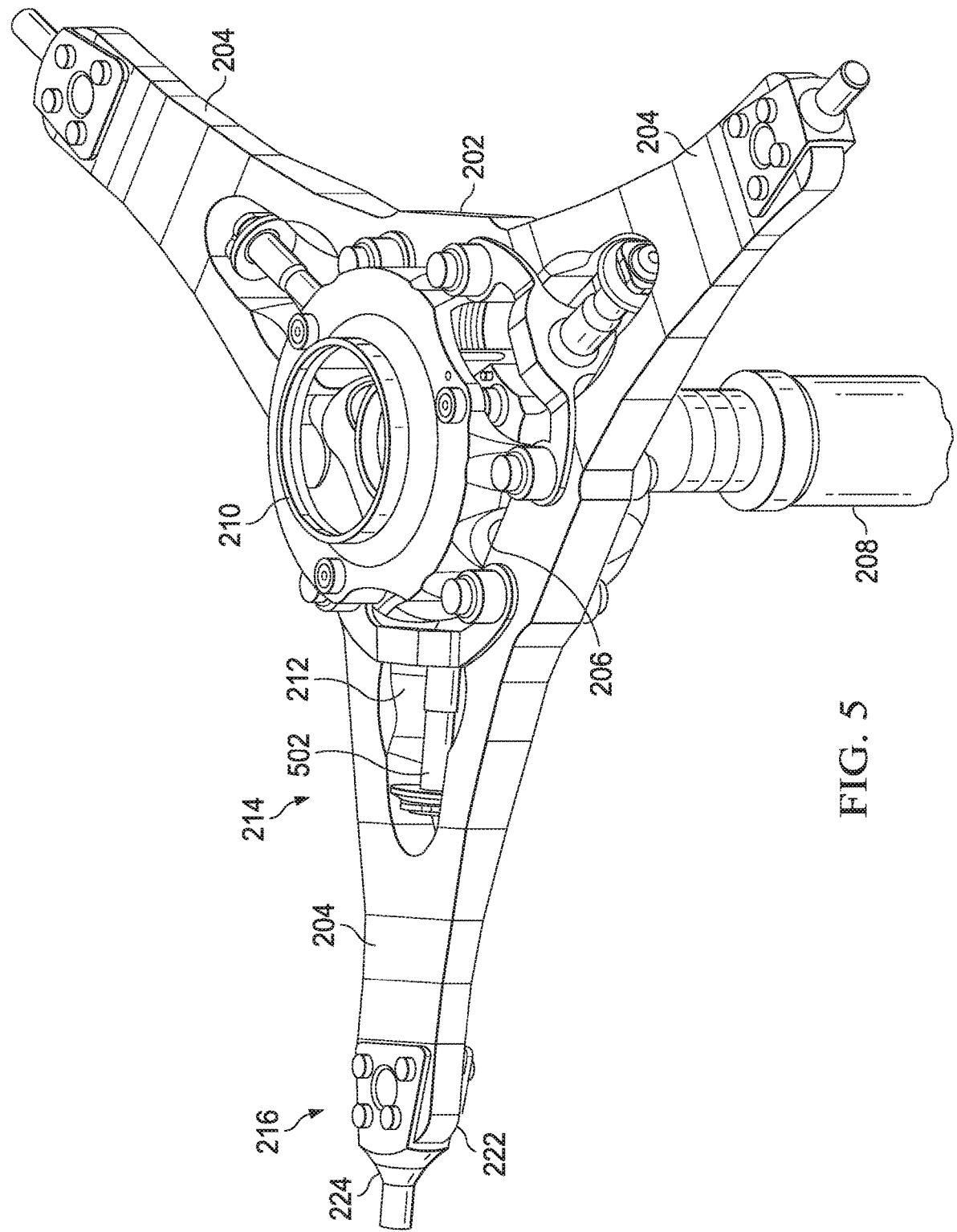
FIG. 5 is a perspective view of a yoke according to aspects of the disclosure.

Referring to FIG. 5, each yoke arm 204 includes inboard bearing attachment 214 and outboard bearing attachment 216. Inboard bearing attachment 214 is positioned within cut-out 212 and is attached to yoke arm 204 at central aperture 206. Inboard bearing attachment 214 includes inboard bearing retainer 502. Inboard bearing retainer 502 is attached to a centrifugal force ("CF") bearing and an inboard shear bearing. Both the CF bearing and the inboard shear bearing are also attached to an inboard beam which may connect to a cuff or grip which extends to a rotor blade. Outboard bearing attachment 216 is attached to yoke arm 204 at tip 222. Outboard bearing attachment 216 includes outboard shear bearing spindle 224. Outboard bearing attachment 216 is attached to an outboard shear bearing. The outboard shear bearing is attached to an outboard beam which may connect to the cuff or grip.

Figure 6:
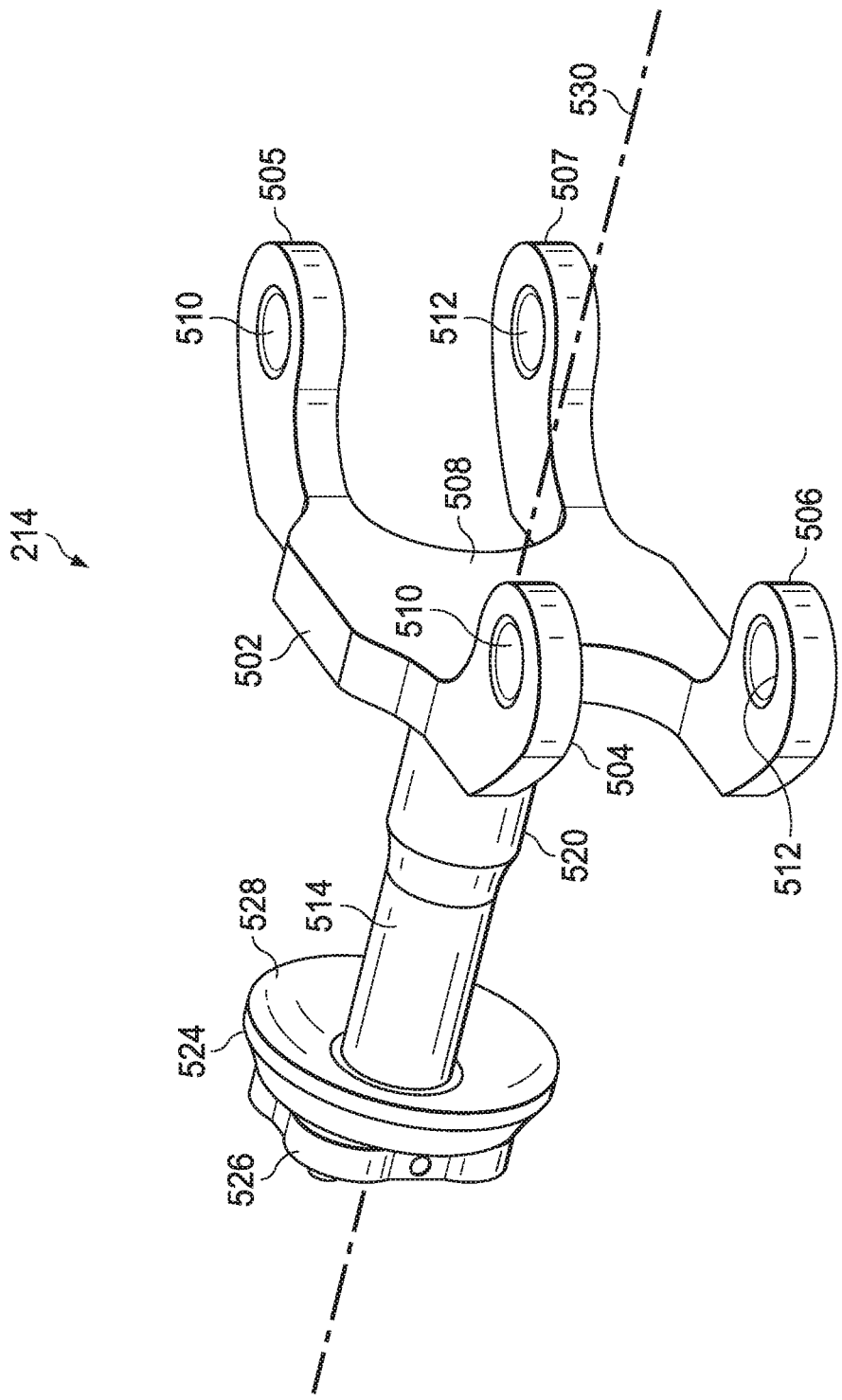
FIG. 6 is a perspective view of an inboard bearing attachment according to aspects of the disclosure.

Referring to FIG. 6, inboard bearing attachment 214 includes inboard bearing retainer 502, CF fitting 524, and spindle nut 526. For strength purposes, inboard bearing retainer 502 is metal and may be manufactured of, for example, aluminum, steel, or titanium. Inboard bearing retainer 502 includes upper flanges 504, 505 and lower flanges 506, 507 extending from block 508. Upper flanges 504, 505 include mounting holes 510. Lower flanges 506, 507 include mounting holes 512. Mounting holes 510, 512 are used to connect inboard bearing retainer 502 to yoke 202 and hub spring 210. Spindle shaft 514 extends from block 508. Spindle shaft 514 is generally cylindrical and includes shear bearing retainer 520. Spindle shaft 514 is unitarily formed with shear bearing retainer 520. Inboard bearing retainer 502 may be a unitary piece including upper and lower flanges 504-507, block 508, and spindle shaft 514.

CF fitting 524 is connected to spindle shaft 514. CF fitting 524 includes curved surface 528. Curved surface 528 conical or parabolic shaped. The CF bearing connected to the inboard beam surrounds spindle shaft 514 and is attached to curved surface 528. Spindle nut 526 is connected to CF fitting 524 to prevent rotation of the CF bearing relative to spindle shaft 514. The inboard shear bearing connected to the inboard beam is attached to shear bearing retainer 520.

CF fitting 524, particularly curved surface 528, is concentrically aligned with spindle shaft 514. CF fitting 524 and spindle shaft 514 share central axis 530. CF fitting 524 and shear bearing retainer 520 are axially aligned along central axis 530.

Figure 7:
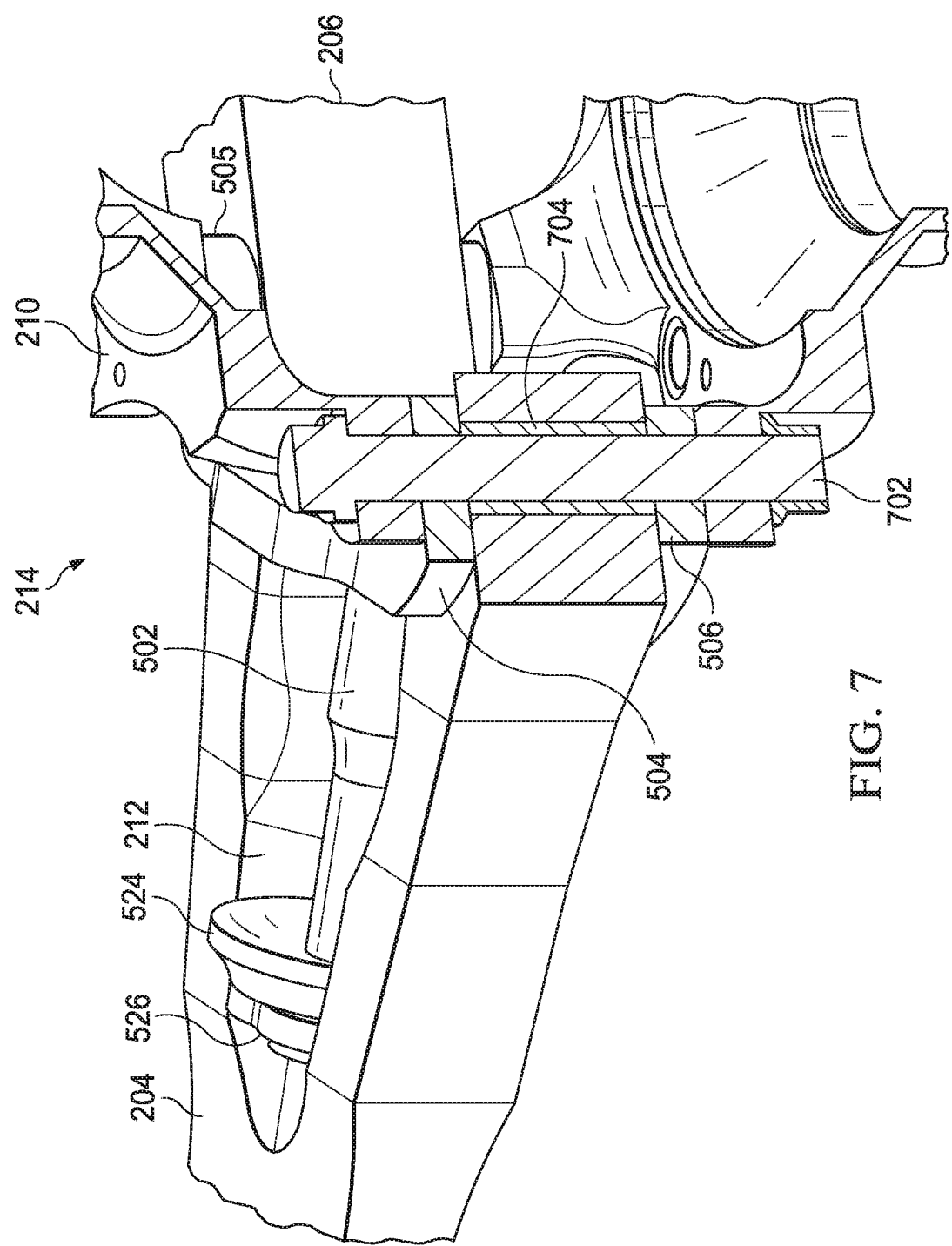
FIG. 7 is a sectional perspective view of an inboard bearing attachment attached to a yoke according to one or more aspects of the disclosure.

Referring to FIG. 7, inboard bearing attachment 214 is positioned within cut-out 212 and is attached to yoke arm 204 and hub spring 210 at central aperture 206. Hub bolts 702 are sized to engage bushings 704 seated within mounting holes 510, 512. Hub bolts 702 are used to connect inboard bearing retainer 502 to yoke arm 204 and hub spring 210 with a CF connection. Although two hub bolts 702 are depicted, it is understood that greater or fewer CF bolts may be used to attach inboard bearing retainer 502 to yoke arm 204 and hub spring 210 depending on load requirements of tiltrotor aircraft 100. Bushings 704 may be used to help spread the CF load carried by hub bolts 702.

The CF load path of a rotor blade attached to yoke 202 is from the rotor blade, to the inboard beam, through the CF bearing to inboard bearing retainer 502, through hub bolts 702/bushings 704, to yoke 202 and hub spring 210.

For weight saving and flexibility purposes, it is preferable to manufacture yoke 202 from composite material. Inboard bearing attachment 214 provides for the CF bearing to be attached to the yoke inboard of the tip of the yoke arm. In addition to space saving advantages in a blade fold arrangement, when the CF bearing is positioned inboard of the tip of the yoke arm, the flexibility of a composite yoke arm outboard of the inboard bearing attachment 214 is retained.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotor system for a rotorcraft comprising:
   a yoke including a yoke arm having an outboard tip, the yoke arm forming a cut-out inboard of the outboard tip;
   a shear bearing;
   a centrifugal force bearing; and
   an inboard bearing attachment disposed in the cut-out of the yoke arm, the inboard bearing attachment comprising:
   a centrifugal force fitting including a block abutting the centrifugal force bearing having top and bottom sides and leading and lagging edges, the centrifugal force fitting including a mounting plate on one of the top or bottom sides of the block, the mounting plate extending beyond the leading and lagging edges of the block to form at least one leading mounting hole adjacent to the leading edge of the block and at least one lagging mounting hole adjacent to the lagging edge of the block, the mounting plate configured to mount to the yoke arm via the leading and lagging mounting holes; and a shear bearing retainer forming a hollow cylinder axially aligned with the block, the hollow cylinder having an interior cylindrical surface configured to encompass the shear bearing, the hollow cylinder having a leading side and a lagging side;

wherein, the shear bearing retainer includes a leading flange protruding from the leading side of the hollow cylinder to form at least one second leading mounting hole and a lagging flange protruding from the lagging side of the hollow cylinder to form at least one second lagging mounting hole, the leading and lagging flanges curving in an inboard direction such that the second mounting holes are inboard of the hollow cylinder; and wherein, the top and bottom sides and the leading and lagging edges of the block are curved to form a circle.

2. The rotor system as recited in claim 1 wherein the centrifugal force fitting is a unitary piece with the mounting plate.

3. The rotor system as recited in claim 1 wherein the mounting plate forms a plurality of leading mounting holes and a plurality of lagging mounting holes.

4. The rotor system as recited in claim 1 wherein the shear bearing retainer includes upper and lower leading flanges and upper and lower lagging flanges.

5. The rotor system as recited in claim 1 wherein a centrifugal force load path extends through the centrifugal force fitting and the yoke arm inboard of the tip.

6. The rotor system as recited in claim 1 wherein the block has an inboard side forming a curved surface.

7. The rotor system as recited in claim 1 wherein the block has an inboard side forming a conical surface.

8. The rotor system as recited in claim 1 wherein the block has an inboard side forming a parabolic surface.

9. The rotor system as recited in claim 5 wherein the centrifugal force fitting is connected to the yoke arm at a centrifugal force connection and the centrifugal force load path includes the centrifugal force connection.

10. A tiltrotor aircraft comprising:
a fuselage;
a wing supported by the fuselage; and
a rotor system coupled to the wing, the rotor system comprising:
a yoke including a yoke arm having an outboard tip, the yoke arm forming a cut-out inboard of the outboard tip;
a shear bearing;
a centrifugal force bearing; and
an inboard bearing attachment disposed in the cut-out of the yoke arm, the inboard bearing attachment comprising:
a centrifugal force fitting including a block abutting the centrifugal force bearing having top and bottom sides and leading and lagging edges, the centrifugal force fitting including a mounting plate on one of the top or bottom sides of the block, the mounting plate extending beyond the leading and lagging edges of the block to form at least one leading mounting hole adjacent to the leading edge of the block and at least one lagging mounting hole adjacent to the lagging edge of the block, the mounting plate configured to mount to the yoke arm via the leading and lagging mounting holes; and a shear bearing retainer forming a hollow cylinder axially aligned with the block, the hollow cylinder having an interior cylindrical surface configured to encompass the shear bearing, the hollow cylinder having a leading side and a lagging side;

wherein, the shear bearing retainer includes a leading flange protruding from the leading side of the hollow cylinder to form at least one second leading mounting hole and a lagging flange protruding from the lagging side of the hollow cylinder to form at least one second lagging mounting hole, the leading and lagging flanges curving in an inboard direction such that the second mounting holes are inboard of the hollow cylinder; and wherein, the top and bottom sides and the leading and lagging edges of the block are curved to form a circle.

11. The tiltrotor aircraft of claim 10 wherein the mounting plate further comprises upper and lower mounting plates, the upper mounting plate coupled to the top side of the block and the lower mounting plate coupled to the bottom side of the block.

12. The tiltrotor aircraft of claim 11 wherein the upper and lower mounting plates are unitarily formed with the block.

13. The tiltrotor aircraft of claim 11 wherein the upper and lower mounting plates are separately connected to the block.

* * * * *